United States Patent [19]

Council

[11] Patent Number: 4,893,856
[45] Date of Patent: Jan. 16, 1990

[54] COMBINED TRAILER HITCH AND STORAGE BUMPER

[76] Inventor: Jackie L. Council, 5801 Greenway Ave., Newport News, Va. 23605

[21] Appl. No.: 313,442

[22] Filed: Feb. 21, 1989

[51] Int. Cl.[4] .................. B60R 19/02; B60R 19/24
[52] U.S. Cl. .................................. 293/106; 293/155; 296/37.6
[58] Field of Search .............. 293/117, 106, 155, 102, 293/149, 150, 151, 152, 153; 280/505, 500, 163, 164.1, 164.2; 296/37.6

[56] References Cited

U.S. PATENT DOCUMENTS

| | | | |
|---|---|---|---|
| 3,471,070 | 10/1969 | Olson | 224/42.04 |
| 3,501,170 | 3/1970 | DaValle | 280/500 |
| 3,578,358 | 5/1971 | Reynolds | 293/155 |
| 3,606,385 | 9/1971 | Johannes | 280/500 |
| 3,614,136 | 10/1971 | Dent | 280/500 |
| 4,138,152 | 2/1979 | Prue | 293/117 |
| 4,570,986 | 2/1986 | Sams | 293/117 |
| 4,634,163 | 1/1987 | Bundy et al. | 293/117 |
| 4,674,782 | 6/1987 | Helber | 293/106 |
| 4,738,464 | 4/1988 | Putnam | 280/500 |

*Primary Examiner*—Andres Kashnikow
*Assistant Examiner*—Mark T. Le
*Attorney, Agent, or Firm*—Wallace J. Nelson

[57] ABSTRACT

A replacement bumper/trailer hitch assembly for replacing original equipment rear bumpers on pickup trucks, vans and like vehicles including a first structure (45) having a pair of support bars (47) and (48) adjustably secured at one end thereof to vehicle frame (40) and having an angle mounting plate (49) transversely attached to the spaced respective other ends thereof. A tapered flat extension plate (54) is welded to mounting plate (49). A plurality of openings (58–63) are provided in extension plate (54) and serve to attach a ball type trailer hitch, a license plate light and for receiving mounting screws (43) serving to attach a second structure comprising a vehicle bumper assembly (10) thereto. Bumper assembly (10) is provided with a rain drain channel (39) along substantially the rear length thereof adjacent vehicle (11). A pair of storage compartments (15), (25) are disposed on opposite ends of bumper (10) with a recessed intermediate area provided for displaying a license plate and for attachment to first structure (45). The intermediate area includes a strengthening plate (34) and a bottom area (32), both of which have a plurality of holes aligned with holes (58–63) in extension plate (54). All exposed surfaces of the vehicle bumper may be provided with a chrome layer (79) (FIG. 3). A rubber mat (75) is provided for the top closure of each compartment and suitable decorative molded rubber strips (73) and (77) extend along the front and at least one end of each compartment. Rubber strips (77) and (76) also serve to make compartments (15) and (25) watertight.

18 Claims, 2 Drawing Sheets

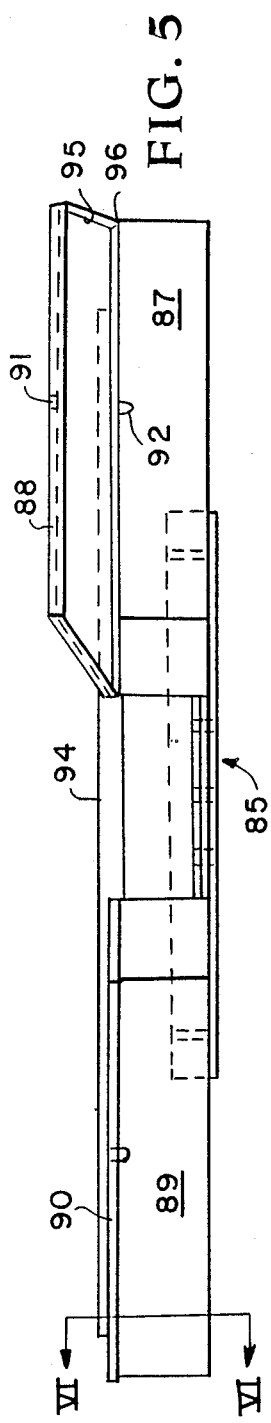
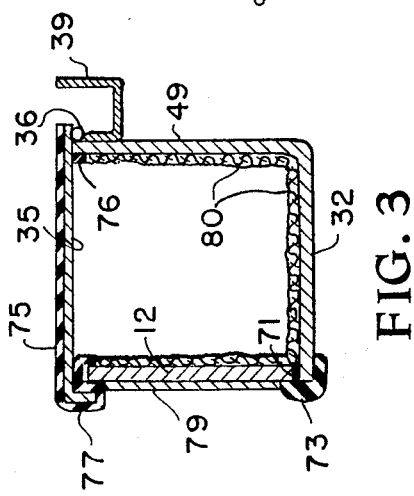
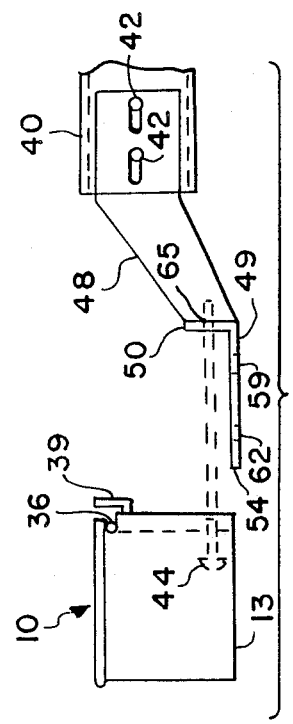
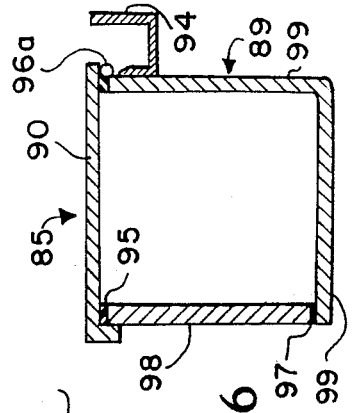

COMBINED TRAILER HITCH AND STORAGE BUMPER

FIELD OF THE INVENTION

The invention relates to a combined trailer hitch and storage bumper for replacing original equipment rear bumpers on pickup trucks, vans and the like.

BACKGROUND OF THE INVENTION

The original equipment rear bumpers now received on pickup trucks, vans, and like vehicles, may be an attractive chrome "dress" bumper or a lightweight "work" bumper provided with a flat checkered top area and a recessed center section for mounting the vehicle license plate and that also serves to support a ball type trailer hitch. Most vehicles of this type designed for work vehicles come equipped with the latter type while many prefer the chrome "dress" type. The lightweight work-type bumpers are designed to accommodate only lightweight trailers and do not have storage compartments built therein. The dress-type bumpers are attractive in appearance but many vehicle owners prefer to customize their vehicles by replacing various original equipment, including bumpers, with more decorative, and sometimes more useful, paraphernalia. Likewise, owners of work-type pickup trucks and vans may have a need for more durable and heavy weight bumper assemblies to accomplish the work tasks desired. Combination storage bumper-trailer hitch assemblies are known but most are unattractive or cumbersome in appearance, difficult to attach to the vehicle, and expensive to manufacture. The present invention is intended to appeal to both the owners of dress-type pickup and van vehicles as well as to the owners of work-type pickup and van vehicles.

Accordingly, it is an object of the present invention to provide a heavy duty trailer hitch and storage bumper combination that is inexpensive to manufacture and may be provided in kit form as a replacement for original equipment bumpers on pickup trucks, vans, and like vehicles.

Another object of the present invention is a combination trailer hitch and storage bumper that is attractive in appearance and formed of durable long-lasting materials.

A further object of the present invention is a trailer hitch and storage bumper combination wherein two separate water-tight storage compartments form part of the bumper assembly.

An additional object of the present invention is the provision of a water drain channel disposed adjacent the top edge of the storage compartments of a storage bumper assembly.

A further object of the present invention is a kit for replacing original equipment vehicle bumpers with an attractive vehicle bumper that has a pair of water-tight storage compartments therein.

SUMMARY OF THE INVENTION

According to the present invention, the foregoing and additional objects are attained by providing a first structure including a pair of elongated metal support bars, disposed in spaced relationship and adapted to be secured at one end thereof to a vehicle frame and having an angle mounting plate member transversely disposed and attached to the spaced respective other ends thereof. A tapered flat plate extension is welded at the long side thereof to the transverse mounting plate member and is provided with at least one opening adjacent to the opposite or short side for attaching a ball type trailer hitch thereto. A second structure is adapted to be secured to the first structure and includes a vehicle bumper provided with a storage compartment at each end thereof and a recessed intermediate area adapted for connection with the flat plate extending from the first structure. All exposed surfaces of the vehicle bumper may be provided with a painted or a chrome finish for aesthetic purposes with appropriate rubber mat top coverings and internal sealing edges provided on the top portions of each storage compartment. Suitable decorative rubber and shock absorber strips may also be disposed on the edge surfaces of the compartment tops and the front and side faces of the bumper compartments.

BRIEF DESCRIPTION OF THE DRAWINGS

A more complete appreciation of the present invention and many of the attendant advantages thereof will be readily apparent as the same becomes better understood with reference to the following detailed description when considered in connection with the accompanying drawings wherein:

FIG. 3 is a sectional view of the bumper assembly shown in FIGS. 1 and 2 and taken along line III—III of FIG. 1;

FIG. 4 is a part exploded side view of the structure shown in FIG 1;

FIG. 5 is a front view of a heavy duty, work version bumper assembly according to the present invention with one of the compartment closures tops being shown in the open position; and FIG. 6 is a sectional view of the work bumper shown in FIG. 5 and taken along line VI—VI thereof.

DETAILED DESCRIPTION

Figure 1:
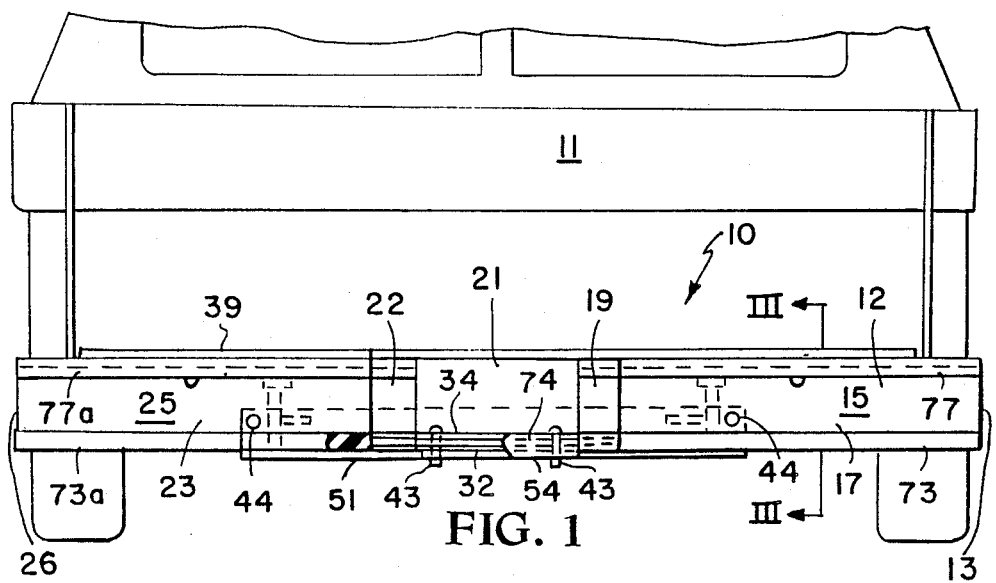
FIG. 1 is a front view of the preferred embodiment of the present invention when installed on an exemplary pickup truck vehicle.

Referring now to the drawings and more particularly to FIG. 1, the storage bumper assembly of the present invention is shown and designated generally by reference numeral 10. Storage bumper assembly 10 is attached as the rear bumper of a conventional pickup truck vehicle 11. The front face of bumper 10 is constructed of a single piece metal member 12 formed to provide a first curved end 13 serving as one end of a first storage compartment 15. A first flat area 17 extends from the first curved end 13 and serves as the front of first storage compartment 15. A first angular segment 19 extends at a substantially forty-five degree angle from flat area 17 and serves as the major portion of the end of storaage compartment 15 opposite to end 13. A second flat area 21, parallel with first flat area 17, extends from first angular segment 19 and merges with a second angular area 22 that extends at a substantially forty-five degree angle therefrom to merge with a third flat area 23. Third flat area 23 is of the same dimensions, and in the same plane, as the first flat area 17. Third flat area 23 serves as the front of second storage compartment 25 and merges with a second curved end 26 that forms an end of second storage compartment 25.

Compartments 15 and 25 are joined aft of, and at the center of, single piece front member 12 by a narrow rectangular passageway as will be further explained hereinafter. This rectangular passageway is closed at the top thereof by a plate 28 (FIG. 2) having a pair of vertically extending ends 29,30 welded thereto, and to single piece front member 12, to form the remaining tip end portions for the compartments 15 and 25. The back and bottom of bumper 10 are formed from a single piece metal member angular bent at substantially ninety degrees along the length thereof and welded to the bottom edge, along the front and ends, of single piece front member 12 and to the length of plate 28. The center portion of the bottom is visible in FIG. 1 and is designated by reference numeral 32. A recessed area, not designated, is provided along the center of the vertical side of bent metal member to provide an area on the same level (horizontal plane), and of the same length, as plate 28. A separate metal plate 34 conforming to the area formed by the angular recessed portion of the single piece front member 12 is positioned over and welded, along the back and sides thereof, to front member 12, for strengthening of the assembly.

Closure tops 35, 37 are hingedly connected via piano type hinges 36,38 to the top of respective compartments 15,25. A rain draian groove is formed by channel 39 extending substantially the length of bumper assemble 10. Rain drain 39 is welded to the back metal plate 32 along the length thereof and beneath hinges 36,38 so as to receive rain water from closure tops 35,37 and plate 28. A recessed area, not designated, is provided along the center of the vertical welded side of rain drain 39 to receive any rain or water from plate 28. The aft or exposed vertical side of channel 39 is shorter than the vertical side welded to plate 32 and is adapted to be positioned adjacent the body of vehicle 11 and adequately below the vehicle tail gate so as not to interfere with opening and closing thereof.

Bumper assembly 10 is attached to frame 40 of vehicle 11 via a plurality of bolts as designated by reference numerals 42, 43 and 44.

Figure 2:
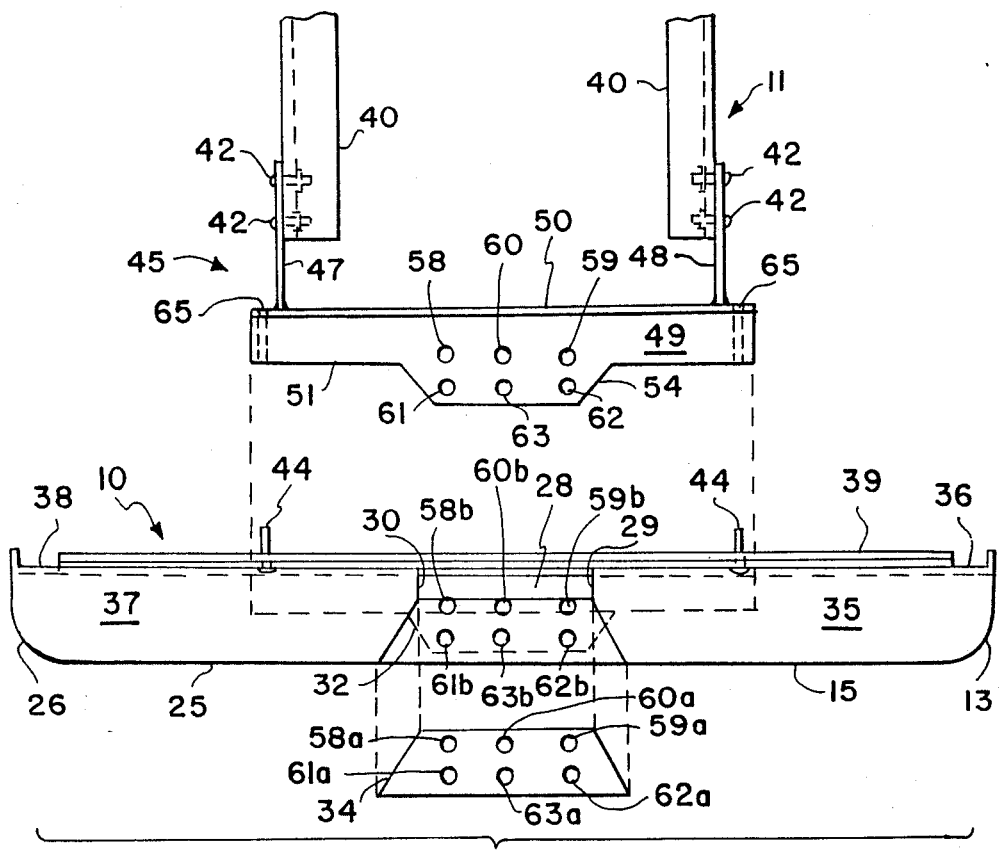
FIG. 2 is a part exploded, top plan view of the component parts of the storage bumper assembly of the present invention shown in FIG. 1.

Referring now more particularly to FIG. 2, the structure for attaching bumper 10 to vehicle 11 is more clearly illustrated and designated generally by reference numeral 45. Structure 45 includes a pair of spaced elongated metal support bars 47,48 having spaced openings along one end thereof and bolted to frame 40 of vehicle 11 by a plurality of bolts 42. The spaced openings receiving bolts 42 permit adjustment of the length of support bars 47,48 as will be further explained hereinafter. An angle mounting plate or bracket 49 is transversely disposed at the opposite ends of spaced support bars 47,48. Support bars 47,48 are welded to the outside surface of the vertical side 50 and adjacent the respective ends of mounting bracket 49.

The horizontal side 51 of mounting bracket 49 has a flat horizontal extension plate 54 welded to and disposed substantially intermediate the length thereof. Extension plate 54 tapers along both sides, and at a substantially forty-five degree angle, away from horizontal side 51 to an end parallel with and of reduced length relative to the side thereof welded to horizontal side 51. Horizontal flat plate 54 is provided with six transverse holes extending therethrough and designated by reference numerals 58, 59, 60, 61, 62 and 63. When bumper 10 is secured to structure 45, these openings line up with corresponding openings 58a, 59a, 60a, 61a, 62a and 63a in metal plate 34 and openings 58b, 59b, 60b, 61b, 62b and 63b in bottom plate 32. Bolts 43 (FIG. 1) are then secured through openings 58, 58a and 58b and 59, 59a and 59b. The function of the remaining aligned openings in horizontal plate 54, bottom member 32 and metal plate 34 will be further explained hereinafter.

Suitable openings 65 (FIGS. 2 and 4) are also provided through the vertical or back portion of angle plate 32 (within compartments 15 and 25) to permit bolts 44 to connect with openings 66 disposed adjacent the ends of vertical side 50 of transverse mounting bracket 49 for attachment of bumper 10 to support structure 45.

Referring now more particularly to FIG. 3, the single piece construction for back/bottom 32 portion of bumper 10 is more clearly illustrated. As shown therein, angle plate 32 is welded to single piece front member 12 along the length thereof as designated by reference numeral 71. A decorative molded rubber strip 73 is adhesively or otherwise conventionally secured to the bottom edge of single piece front member 12. Rubber strip 73 overlaps weld joint 71 along the length of first curved end 13, along first flat area 17, and terminates where first flat area 17 and first angular segment 19 merge. A second decorative rubber strip 73a (FIG. 1) extends from the point of merger of second angular area 22 and third flat area 23 to the terminus of second curved end 26. An additional decorative molded rubber strip 74 abuts rubber strips 73 and 73a and serves to cover the otherwise exposed edges of bottom plate 32, metal plate 34 and horizontal flat plate 54. Rubber molding strips 73, 73a and 74 may also be provided of a one-piece construction, if so desired. Top closure 35 for compartment 15 is provided with a thin rubber mat 75 adhesively or otherwise conventionally secured thereon. A thin rubber strip 76 is also adhesively secured along the interior top portion of closure 35 to ensure a water-tight seal with the edge of back 32.

Another decorative rubber strip 77 is secured to the edge of closure top 35 and extends over the overlapping surface area of closure top 35 along both ends and the front thereof. Rubber strip 77 has an integral thin extension that overlaps the edges of closure top 35 to cover the interior lip thereof along these surfaces, a portion of the inside top area and a depending surface spaced from the cover top lip to form a groove or channel along the interior edge of closure top 35. This groove or channel serves to receive the top edge surface of compartment 15 housing when closure top 35 is closed to thereby serve as a water-tight seal gasket for compartment 15 along these areas. All surfaces of rubber strip 77 in contact with closure top 35 are adhesively or otherwise conventionally secured thereto.

A similar rubber strip 77a is disposed on closure top 37 (FIG. 1) and performs in the same manner as rubber strip 77. Also, a rubber strip, similar to strip 76 (not shown), may be disposed on the interior rear surface of chrome top 37, although the overlapping edge of top 37 provides adequate rain protection. The exposed surface area of single piece member 12, the area seen between rubber strips 73, 73a and 77, 77a, is provided with a layer of decorative chrome 79 for aesthetic purposes. Chrome layer 79 may be in the form of a coating or a strip of material adhesively bonded or bolted to the surface of the single piece front member 12. The other exposed metal surfaces, the entire recessed area of bumper 10, is also provided with a chrome coating or plating for aesthetic purposes. Also, compartment 15 (and 25) may be provided with a carpet type lining 80 on some or all of the interior surfaces thereof for aesthetic, as well as, sound proofing purposes.

Referring now to FIGS. 5 and 6, an embodiment of the bumper assembly of the present invention designed for heavy duty work is shown and designated generally by reference numeral 85. As in the previously described embodiment, two compartments 87, 89 are formed at the opposite ends of bumper assembly 85. Each compartment 87, 89 is provided with a closure top as designated, respectively, by reference numeral 88, 90. Closure top 88 is shown in the open position in FIG. 5 and illustrates a lock clamp 91 within closure top 88 that may be locked by key lock 92 when top 88 is in the closed position. Suitable conventional locks are employed for each of the closure tops 88, 90, as well as for closure tops 35, 37.

A rubber gasket seal 95 is adhesively attached to the inner overhanging lip of closure top 90 (as well as closure 88, not shown) to provide a water tight seal for compartment 89 (and 92). A rubber strip seal, not designated, may also be provided on the interior portion of closure 90 (and 88) to seal with back 99. Weld joint 97 serves to connect a single piece front member 98 to an angle plate 99 that forms the bottom and back for bumper 85. Hinge 96 for closure top 88 (FIG. 5) and 96a for closure top 90 (FIG. 6), as well as rain drain channel 94 are identical to like elements of the previously described embodiment. The primary difference in the work version bumper illustrated in FIGS. 5 and 6 and that of the "dress" version of FIGS. 1-4 is that heavier grade materials are normally used in the work version and the decorative rubber trim, chrome and carpeting omitted. Normally, a coating of aluminum or black paint serves as the only decorative trim needed for the work version bumper.

In a specific example of the work version bumper assembly shown in FIGS. 5 and 6, rain drain channel 94 was formed of a six and one-half foot length of 14-gauge steel plate and bent to provide a one and one-half inch rear vertical area, a one and one-half inch horizontal drain area and a three-quarter inch vertical front area that was welded to the length of bumper 85. Bottom/back angle plate 99 was also formed of a six and one-half foot length plate and bent to provide a seven inch height for the vertical back area and an eight inch width for the horizontal bottom area. The single piece front member was formed of an eight foot length, seven inch wide, 10-gauge steel plate. The mounting bracket or transverse angle plate in both the work and dress version bumpers was formed of four-foot lengths of three-sixteenths inch steel plate bent to provide three-inch horizontal and three-inch vertical sides. The horizontal flat plate extension 54 and the tapered metal plate 34, as well as elongated metal support bars 47,48 (shown in FIG. 1), were also formed of 14-gauge steel plate in the work version illustrated in FIGS. 5-6.

Closure tops 88,90 were also formed of 14-gauge "checkered plate" steel. One quarter-inch diameter, grade eight, one and one-half inch long, carriage head bolts were employed for bolts 42, 43 and 44 in this specific example. These specific materials are not mandatory for practice of the present invention and lighter weight (gauge) materials may be employed, particularly in construction of the dress version bumper. For example, stainless steel plate, of various thicknesses, may be employed for the single piece front member 12 in the dress version, when so desired. The steel plate used in each version may, for example, be in the range of 10-gauge to one-quarter inch for front member 12 and 14–16 gauge steel plate for the bottom/back member, rain drain and closure tops. The transverse mounting plate or bracket 49 and elongated metal segments 47,48 in both versions may be constructed from 3/16 to ½-inch steel plate.

Referring back to FIGS. 1-4, when bumper assembly 10 is attached to vehicle 11, the aligned holes 60, 60a and 60b form a single opening for installation of a snap-in type light assembly for illuminating the vehicle license plate that will be mounted on second flat area 21. Aligned holes 63, 63a and 63b form a single opening for attaching a ball type trailer hitch to bumper assembly 10, while openings 61, 61a and 61b, along with openings 62, 62a and 62b form a pair of holes for attaching safety chains normally employed when pulling a trailer. This trailer hitch assembly, through horizontal flat plate extension 54 and tapered metal plate 34, ensures that essentially all force for pulling a trailer will be directly transmitted directly to the vehicle frame and not to the bumper assembly.

It is to be understood that the present invention is intended to be made available in kit form to permit the vehicle owner or mechanic to replace original equipment with a minimum of labor being required. Each kit will be custom made or constructed for a specific class vehicle and no additional welding or metal work will be required by the installer. The only installing labor expended will be to remove the original equipment and connect the two piece kit of the present invention to the vehicle by positioning bolts 42, 43 and 44 in the right openings and tightening the nuts thereof.

Although the invention has been described relative to specific embodiments thereof, it is not so limited and there are many variations and modifications thereof that will be readily apparent to those skilled in the art in the light of the above teachings without departing from the spirit and scope of the invention.

For example, thin rubber mats 75 on the closure tops may be formed separate from, or integral with, the rubber strip 77. Also, additional decorative rubber strips may be disposed on bumper assembly 10 and disposed as spaced vertical components along the exterior length of the individual compartments or as additional horizontal strips. The welded transverse angle mounting plate 49 and horizontal flat plate extension 54 therefor could be formed from a single metal plate. The spaced openings in elongated metal support bars 47,48 may also be made circular and more numerous than the oval, or slotted, openings shown for adjusting the effective length of the support bars. Also, the specific illustrated angular bend in support bars 47,48 (FIG. 4) is for a specific vehicle class and different vehicle classes may require a different, or no, angular bend in the support bars. The narrow rectantular connecting passageway for compartments 15 and 25 formed at the center of bumper 10 is designed to permit transport of some long tools or implements. This passageway may also be closed off completely, or closed on one side and open at the other, to form a "secret" compartment, if so desired. Carpeting 80 may be omitted and suitable fabric, or rubber mats substituted therefor. Also, pockets may be formed in the carpeting or fabric vertical surfaces in the compartments, with elastic, snap, button or zipper closures provided for these pockets, when so desired. These and other variations and modifications in the present invention will be readily apparent to those skilled in the art and are considered within the scope of the present invention. It is therefore to be understood that, within the scope of the appended claims, the invention may be practiced otherwise than as specifically described herein.

What is claimed as new and desired to be secured by Letters Patent of the United States is:

1. A kit for providing a custom made bumper-trailer hitch assembly to replace the original equipment rear bumper of a pickup truck, van or like vehicle comprising:
   (A) a first structure including
      (1) a pair of elongated support metal bars having a plurality of openings in one end thereof for adjustment attachment to the frame of a pickup, van or like vehicle;
      (2) an elongated mounting bracket disposed transversely to said pair of elongated support metal bars, said mounting bracket being constructed of an angle plate having a vertical and a horizontal side and said pair of elongated support metal bars being secured to said vertical side and adjacent the end of said elongated mounting bracket to maintain said pair of elongated support metal bars in spaced relationship;
      (3) a horizontal flat plate extension extending from said horizontal side of said mounting bracket, said horizontal plate extension having a plurality of openings therein, one of said plurality of openings adapted to receive a ball type trailer hitch; and
   (B) a second structure including
      (1) a vehicle bumper having a storage compartment at each end thereof thereof;
      (2) an individual closure top for each of said compartments;
      (3) sealing means disposed within each said closure top to form a water tight seal for the respective compartments when said closure tops are in the closed position;
      (4) a rain drain channel secured to the rear of and extending substantially the length of said bumper, said rain drain channel having a first vertical surface area, a horizontal surface area integral with said first vertical surface area and a second vertical surface area integral with said horizontal surface area and parallel with said first vertical surface area;
      (5) metal plate means disposed between and secured to said compartments, said metal plate means having a plurality of openings therein equal to and aligned with the plurality of openings in said horizontal plate extension of said first structure; and
   (C) bolt means for connecting said first structure to the vehicle frame and for connecting said metal plate and each said compartment of said second structure to said mounting bracket of said first structure.

2. The kit of claim 1 wherein said flat horizontal plate extension is disposed at substantially the intermediate length of said horizontal side of said mounting bracket, said horizontal plate extension having a pair of sides tapering at a substantially 45° angle from said mounting bracket to an unconnected side thereof.

3. The kit of claim 1 wherein a single angle metal plate forms the bottom and back of each said storage compartment and a single piece metal member is shaped to form one complete end, the front face and substantially all of the other end of each said compartment, said single angle metal plate being provided with a horizontal and a vertical surface area and, said horizontal surface area being welded to the bottom and end edges of said single piece metal member.

4. The kit of claim 3 wherein said single piece metal member is provided with a first curved end serving as one end of a first storage compartment, a first flat area extending from said first curved end and serving as the front of said first storage compartment, a first angular segment extending at substantially a 45° angle from said first flat area and serving as the major portion of the length of the second end of said first storage compartment, a second flat area parallel with said first flat area and extending from said first angular segment, said second flat area merging with a second angular segment extending at a substantially 45° angle therefrom and serving as the major portion of the length of an end of a second storage compartment, said second angular segment merging with a third flat area, said third flat area being of the same dimensions and in the same plane as said first flat area and serving as the front of said second storage compartment, said third flat area merging with a second curved end and said second curved end serving as an end of said second storage compartment.

5. The kit of claim 3 wherein said horizontal surface area of said single angle metal plate includes a horizontal portion disposed between said compartments, a plurality of openings provided in said horizontal portion equal in number to and aligned with the plurality of openings provided in said horizontal flat plate extension when said first and said second structures are placed in position for connection.

6. The kit of claim 5 including a strengthening metal plate member disposed over and conforming in shape to the area formed by said first angular segment, said second flat area and said second angular segment of said single piece metal member, a plurality of openings provided in said strengthening metal plate member equal to and aligned with the plurality of openings provided in said horizontal plate extension extending from said single angle metal plate member, and said strengthening metal plate member being welded to said single piece metal member.

7. The kit of claim 6 including a rectangular plate welded along the length of a first side surface to the back of said second flat area of said single piece metal member and welded along the length of a second side parallel to said first side to the inside surface of the vertical surface area of said single angle metal plate, said rectagular plate having vertical extending end segments serving as a minor portion of an end of each said compartment.

8. The kit of claim 6 including a piano type hinge connecting each said closure top to one of said compartments and lock means for releasably locking each said closure top in closed position.

9. The kit of claim 6 including each said closure top being provided with an overlaying lip surface encasing a portion of the front and ends of each said compartment, a thin rubber mat adhesively bonded to the top of each said closure door, a decorative rubber strip secured to the outside edge of each said overlaying lip surface of each said closure top, said decorative rubber strip having an integral thin extension overlapping the edges of each said overlaying surface of each said closure top, said thin extension being adhesively bonded to the interior of said overlaying surface and to the area of the top surface of each said closure top, said integral thin extension being also provided with a depending surface spaced from said overlaying lip surface of each said closure to thereby form a groove or channel for receiving the front and end surfaces of each said compartment housing and serve as a portion of said sealing means forming a watertight seal for each said compartment.

10. The kit of claim 6 including a decorative molded rubber strip secured to the bottom edge of said single piece front member at least along the surface thereof forming the ends and front of each said compartment and also serving to obscure from view the weld connection between said single piece front member and the horizontal surface of said single angle metal plate forming the bottom of each said compartment.

11. The kit of claim 6 including a carpet lining positioned on the interior surface area of each said compartment.

12. The kit of claim 6 including a chrome metal covering for said single piece front member along at least the end and front portions of each said compartment.

13. The kit of claim 12 wherein said chrome metal covering is a plated layer of chrome deposited on said single piece metal member.

14. The kit of claim 12 wherein said chrome metal covering is a separate metal layer secured to said single piece metal member.

15. A combined trailer hitch/storage bumper for pickup trucks, vans or like vehicles, comprising in combination:
(A) a first structure comprising a bracket support for a vehicle bumper and including
  (1) a pair of elongated metal segments each having a first and a second end, and a plurality of spaced openings provided along a portion of their length at said first end thereof;
  (2) a transverse elongated mounting bracket having a vertical and a horizontal flat side, said vertical side of said transverse elongated mounting bracket being welded to said second end of each of said elongated metal segments at an area spaced from the ends of said transverse mounting bracket and serving to maintain said pair of elongated metal segments in spaced parallel relationship;
  (3) a horizontal flat plate member having a first side disposed substantially intermediate the length of said horizontal flat side of said transverse mounting bracket, a pair of sides tapering and extending from said first side of said horizontal flat plate member to a second side parallel with and of reduced length relative to said first side of said horizontal flat plate;
  (4) a pair of spaced openings provided through said vertical flat side of said transverse mounting bracket; and
  (5) a plurality of openings provided in said horizontal flat plate member;
(B) a second structure comprising a vehicle bumper and adapted to be attached to said first structure and including
  (1) a vehicle bumper having a storage compartment at each end thereof and provided with a central connecting area for said storage compartments;
  (2) a single piece metal member forming the central connecting area as well as the front and ends of said storage compartments;
  (3) said single piece metal member having a first curved area and forming an end of one storage compartment; a first flat area extending from said first curved end and forming the front of said one storage compartment; an angular segment extending from said first flat area and forming the major portion of the other end of said one storage compartment; a second flat area extending from said angular segment and forming a portion of the central connecting area between the two storage compartments; a second angular segment leading from said second flat area and forming the major portion of an end of the other of said storage compartments; a third flat area in the same plane and having the same dimensions as said first flat area and extending from said second angular segment and forming the front of said other storage compartments; and a second curved area extending from said third flat area and forming an end of said other storage compartment;
  (4) a bottom plate member conforming in shape to the curved ends and having an edge extending the length of said single piece metal member, said bottom plate member being parallel with said first and third flat areas of said said single piece metal member and being attached to said single piece metal member to serve as the bottom surface of each said compartment;
  (5) a flat plate extension of said bottom plate member disposed perpendicular thereto and serving as the back of each of said compartments; each said compartment back being provided with at least one through opening therein and in alignment with said pair of through openings provided in the vertical side of said transverse mounting bracket;
  (6) a rain drain channel member attached to and extending in back of each said compartment and;
  (7) a closure top for each said compartment, each said closure top being hingedly connected along one side thereof to said flat plate extension member serving as the back of said compartments, each said closure top having an overlaying lip surface on all sides thereof;
  (8) sealing means disposed about the interior periphery of each said closure top to provide a watertight seal for each said compartment when said closure tops are in closed position; and
(C) means for connecting said first structure to the frame of a vehicle and for connecting said second structure to said first structure.

16. The combined vehicle trailer hitch/storage bumper of claim 15 including decorative rubber strips attached to and extending along the lengths of said single piece metal member at least along the ends and first and third flat surface areas thereof.

17. The combined vehicle trailer hitch/storage bumper of claim 16 including a chrome surface layer secured to at least some of the exposed surfaces of said single piece metal member.

18. The combined vehicle trailer hitch/storage bumper of claim 16 including a chrome surface provided on at least all of the exposed surfaces of said single piece metal member.

* * * * *